March 29, 1960 F. R. SAXBY ET AL 2,930,530

ELECTRONIC DIGITAL SERIAL BINARY ADDERS

Filed Nov. 9, 1955 5 Sheets-Sheet 1

INVENTORS
FRANK R. SAXBY & RONALD PRITCHARD

BY Earl Benst
Louis A Kline
THEIR ATTORNEYS

March 29, 1960 F. R. SAXBY ET AL 2,930,530

ELECTRONIC DIGITAL SERIAL BINARY ADDERS

Filed Nov. 9, 1955 5 Sheets-Sheet 2

INVENTORS
FRANK R. SAXBY & RONALD PRITCHARD
BY Karl Berst
Louis A Kline
THEIR ATTORNEYS

ELECTRONIC DIGITAL SERIAL BINARY ADDERS

Filed Nov. 9, 1955

5 Sheets-Sheet 3

INVENTORS
FRANK R. SAXBY & RONALD PRITCHARD
BY Carl Beust
Louis A Kline
THEIR ATTORNEYS March 29, 1960 F. R. SAXBY ET AL 2,930,530

ELECTRONIC DIGITAL SERIAL BINARY ADDERS

Filed Nov. 9, 1955

5 Sheets-Sheet 4

INVENTORS
FRANK R. SAXBY & RONALD PRITCHARD
BY Hearl Berst
Louis A Kline
THEIR ATTORNEYS March 29, 1960 F. R. SAXBY ET AL 2,930,530

ELECTRONIC DIGITAL SERIAL BINARY ADDERS

Filed Nov. 9, 1955 5 Sheets-Sheet 5

INVENTORS
FRANK R. SAXBY & RONALD PRITCHARD
BY Earl Beust
Louis A Kline
THEIR ATTORNEYS

United States Patent Office 2,930,530

Patented Mar. 29, 1960

2,930,530

ELECTRONIC DIGITAL SERIAL BINARY ADDERS

Frank Reginald Saxby, Eastcote, and Ronald Pritchard, Ickenham, England, assignors to The National Cash Register Company, Dayton, Ohio, a corporation of Maryland Application November 9, 1955, Serial No. 545,932

Claims priority, application Great Britain November 15, 1954

2 Claims. (Cl. 235—176)

Figure 1:
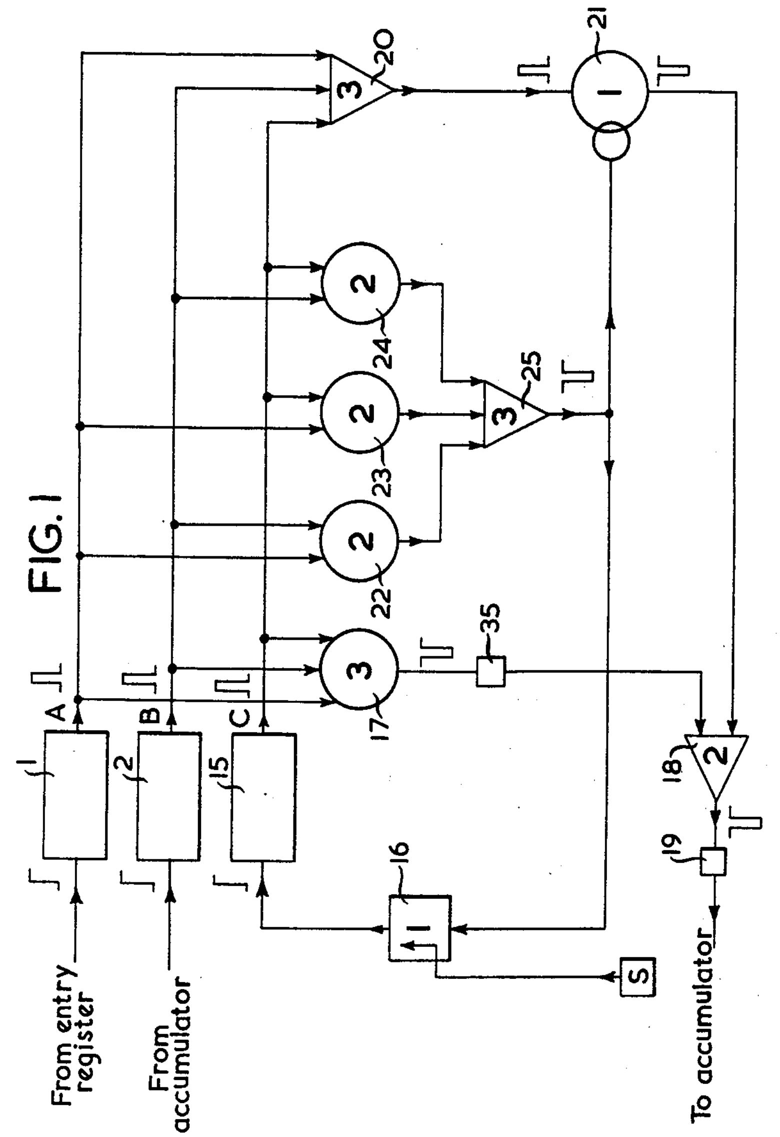

The present invention relates generally to arithmetic devices and more particularly to electronic arithmetic devices utilizing serial input-serial output shifting registers capable of storing data statically.

A known form of shifting register operating according to the binary system of data representation comprises a series of electron discharge tubes preferably of the cold cathode type having the cathodes thereof connected in common to a source of positive shift impulses derived from a suitable drive circuit. The trigger electrode of each tube in the register is separately connected to a signal source such that a predetermined pattern of tubes may be struck to statically represent any particular binary number. The trigger electrode of the first tube in the register is connected to a source of impulses via a delay device, and the trigger electrode of each subsequent tube is connected to the anode of the preceding tube via a similar delay device. In order to shift a binary number statically represented in the register by a combination of struck and extinguished tubes, into, for instance, an adder, positive shift pulses are applied to the cathodes of the tubes to reduce the anode-cathode potential of any conducting tube to cause it to be extinguished and thereby produce an impulse in the anode circuit thereof which is stored in the delay device interconnecting the anode of the extinguished tube and the trigger electrode of the next succeeding tube. As soon as the shift pulse disappears, any pulse stored in any delay device will be applied to the trigger electrode of the succeeding tube, causing the tube to conduct, however, a positive shift impulse applied to an extinguished tube will have no effect on the succeeding tube. It can be seen, therefore, that such pulses applied in common to the tubes of the register will shift the pattern stored in the register by one tube per shift impulse, irrespective of the state of the tubes and that the pattern can be stored for an indefinite period of time in the register by discontinuing the supply of shift impulses.

A characteristic feature of such a serial input-serial output shifting register is that one of two output potential levels is produced therefrom according to the state of the last tube of the register.

With the last tube of the register being in a conducting condition, a positive shift pulse applied thereto will extinguish the tube, and since the tube had originally been rendered conducting during the last part of a preceding shift pulse period, a potential rise in the form of a positive going step function will be the output from the register when the tube is extinguished. With the last tube being in a non-conducting condition, a pulse stored in the delay device associated with the preceding tube in the register will discharge at the end of a positive shift pulse period to cause conduction in the last tube resulting in a potential decrease in the form of a negative-going step function being produced at the anode of the tube.

The adder fed from the shifting registers must thus be adapted to operate in conjunction with shifting register having such a variable output.

In accordance with one aspect of the present invention, a novel digital serial binary adder has been provided for adding numbers wherein the digits are represented by step-function type of input signals. The adder comprises an input circuit for each number being added and an input circuit for any carry signal developed in the previous digit addition. Each of the input circuits includes differentiating means for differentiating the input signals to convert step function type of input signals to impulse type of signals. There is provided a three-coincidence gating device having the inputs thereof connected to the output of each of the input circuits and a two-input sum mixer circuit for receiving any output from the three-coincidence device due to the presence of two digit signals and a carry signal to provide a sum. A three-input mixer circuit is connected to receive the outputs of all of the input circuits and an inhibitor circuit is connected between the three-input mixer circuit and the two-input sum mixer circuit. There is further provided a plurality of two-coincidence gating devices with each having the inputs thereof connected in different combinations to the outputs of the input circuits, and a further three-input mixer circuit for receiving the outputs of the two-coincidence gating devices indicative of a carry signal. A carry-delay device is provided for storing carry signals and for supplying input signals to the carry input circuit when the stored carry signals are released. The further three-input mixer circuit is connected to the carry-delay device to supply carry signals thereto for storage when any two input signals are present and is also connected to the inhibitor circuit to supply gating thereto for suppressing any signal to the sum mixer circuit from the three-input mixer circuit when more than one input signal is present. And, finally, means are provided for synchronizing the release of any stored carry signal from the carry-delay device with the application of digit input signals.

In accordance with another aspect of the present invention, a carry-delay device has been provided for a digital serial binary adder and comprises a gas tube having at least an anode, a cathode, and a firing electrode. An input firing circuit is connected to the firing electrode and is adapted to receive any carry signal in the form of a negative pulse. An output circuit is connected to the anode and means are provided for introducing a series of positive shift pulses to the cathode. And finally, means responsive to the carry pulse are provided for holding the potential level of the firing electrode high until a positive shift pulse decays to fire the tube, thereby producing a delayed carry pulse in the anode output circuit.

A preferred embodiment of the invention will now be described with particular reference to the drawings which accompany and form a part of this specification.

In the drawings:

Fig. 1 is a logical diagram of a serial binary adder according to the invention.

Figs. 2A, 2B, 2C, and 2D show the details of, and the interconnections between the various components of the adder.

*Input circuits*

From the logical diagram (Fig. 1) it is seen that the variable output pulses from two shifting registers, not shown, are passed to the main components of the adder, via input means 1 and 2, as positive-going step function type pulses, input means 1 being associated with an entry shifting register and the other being fed from a shifting register forming part of the accumulator.

Figure 2A:
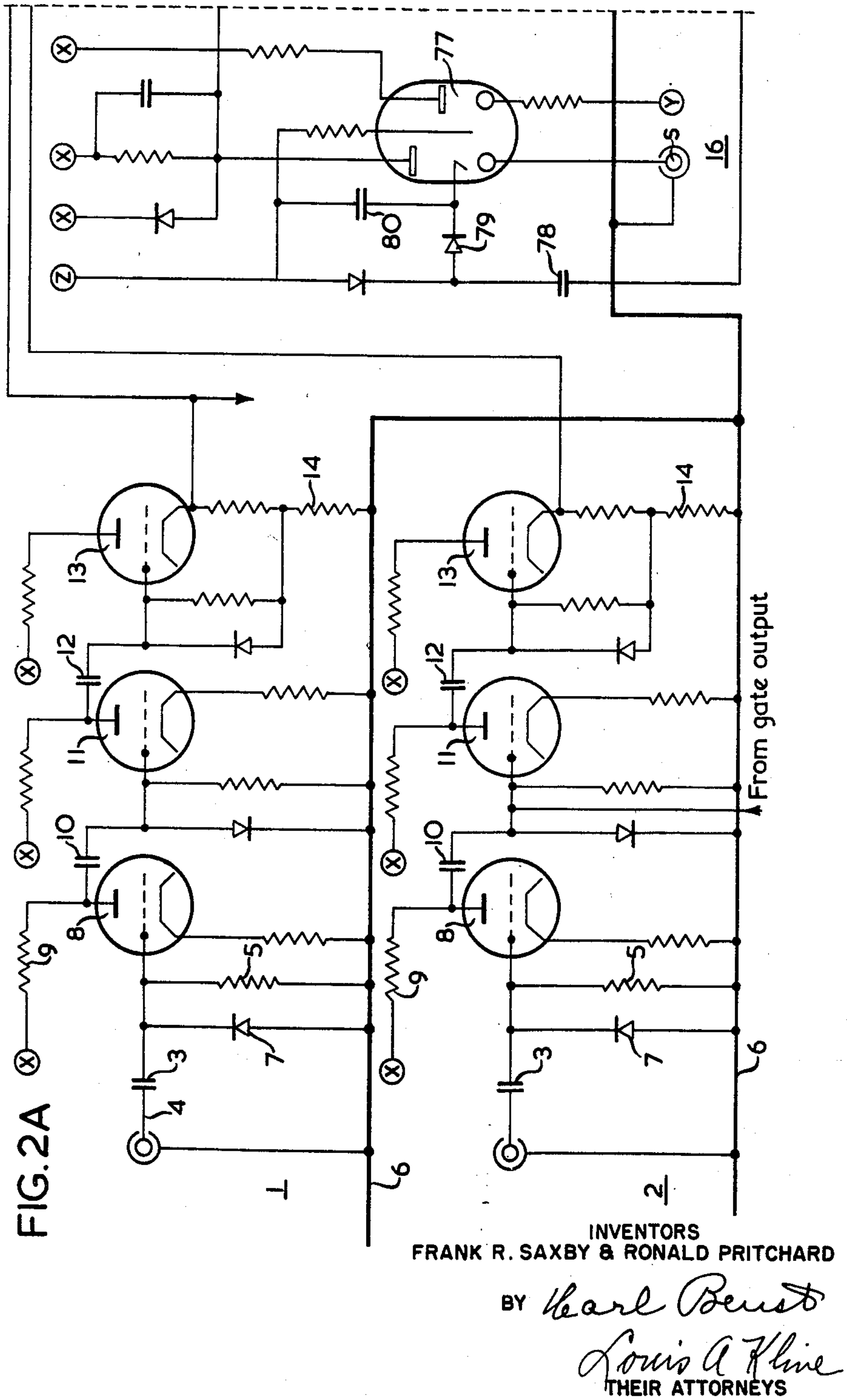

From Fig. 2A it is seen that input means 1 includes a differentiating circuit comprising a capacitor 3, located in the input line 4 from the entry shifting register, and connected in series with a resistor 5 coupled between line 4 and a common ground line 6. A rectifier 7 is also coupled between lines 4 and 6 such as to allow the negative portion of the differentiated shifting register pulse to pass to ground. As the positive portions of the differentiated pulses are of insufficient amplitude for subsequent use, and in order to provide amplification thereof, they are applied to the grid of an amplifying tube 8 having its anode connected to a source of positive potential X, of 270 v., via load resistor 9, and having its cathode connected to ground line 6. Such amplification results in inversion of the pulses and thus the anode of tube 8 is connected via capacitor 10 to the grid of a further amplifying tube 11 connected between the positive potential source X and ground line 6. The positive pulses produced in the anode circuit of tube 11 are applied, via a coupling capacitor 12, to a cathode follower stage which presents a low output impedance to the low impedance input circuit of the next stage of the adder. Such cathode follower comprises a tube 13 having its anode connected to the positive potential source X and its cathode coupled to ground line 6 via a cathode load resistor 14, positive output pulses A (Fig. 1) being produced across this cathode load circuit.

Figure 2B:
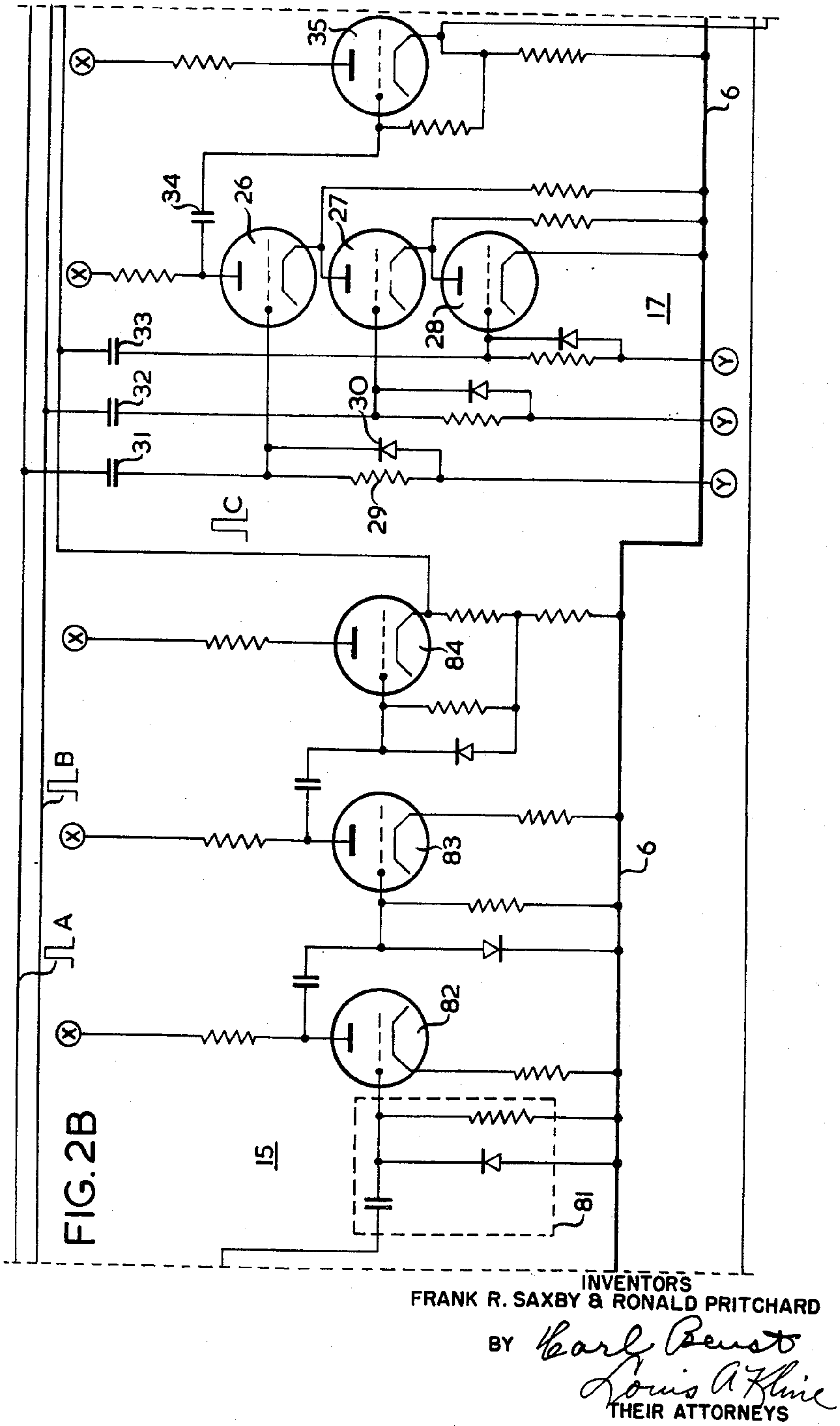

As seen from the logical diagram (Fig. 1), and from Figs. 2A and 2B, input means 2 is similar in construction to that described above and produces positive output pulses B from the cathode follower stage thereof.

Input means 15, similar to input means 1 and 2, is associated with a carry over device 16 giving a one digit delay, and produces positive output pulses C from the cathode follower stage thereof.

The positive output pulses A, B, and C, produced from input means 1, 2, and 15, respectively, are fed to a three-coincidence gating device 17 from which negative pulses pass, via a two-input output mixing circuit 18 and cathode follower stage 19, back to the accumulator when coincidence of pulses A, B, and C, occurs. The positive output pulses A, B, and C, are also fed, via a three input mixing circuit 20 and inhibitor gating device 21, to the second input circuit of the two-input output mixing circuit 18, when the gate 21 is open, and back to the accumulator. Three two-coincidence gate devices 22, 23, and 24, are provided for transferring the combination of positive output pulses A and B, A and C, and B and C, respectively, via a three-input mixing circuit 25, to the inhibitor input circuit of the inhibitor gating device 21 and also to the input circuit of the one-digit delay device 16.

The details of the above components of the adder according to the present invention will now be separately described together with the operation of the various components.

*Three-coincidence gating device*

The three coincidence gating device 17 shown in Fig. 2B comprises three triode tubes 26, 27, and 28, connected in series between the source of positive potential X and the common ground line 6, each of the grids being connected, via a resistor 29 and rectifier 30 arranged in parallel, to a source of negative biasing potential Y, of 25 v., and normally biased to an "off" condition. The grids are also connected via coupling capacitors 31, 32, and 33, to the output circuits of the inverters 1, 2, and 15, respectively, such that the positive output pulses A, B, and C, may be applied thereto. A positive pulse applied to any of the grids will reduce the bias thereon, but a negative output pulse will be produced in the anode circuit of tube 26 only when positive pulses A, B, and C, are applied simultaneously to the grids of tubes 26, 27, and 28, respectively. A single positive pulse applied to one grid, or a pair of positive pulses applied to two of the grids, will be insufficient to cause the tubes to conduct due to the bias existing on the remaining grid or grids. The negative pulses produced at the anode of triode 26, are applied via a coupling capacitor 34 to cathode follower tube 35. The output pulses produced across the cathode load resistor of tube 35 are applied via coupling capacitor 36 (Fig. 2D) to one input circuit of the two-input mixing circuit 18.

*Two-coincidence gating devices*

Figure 2C:
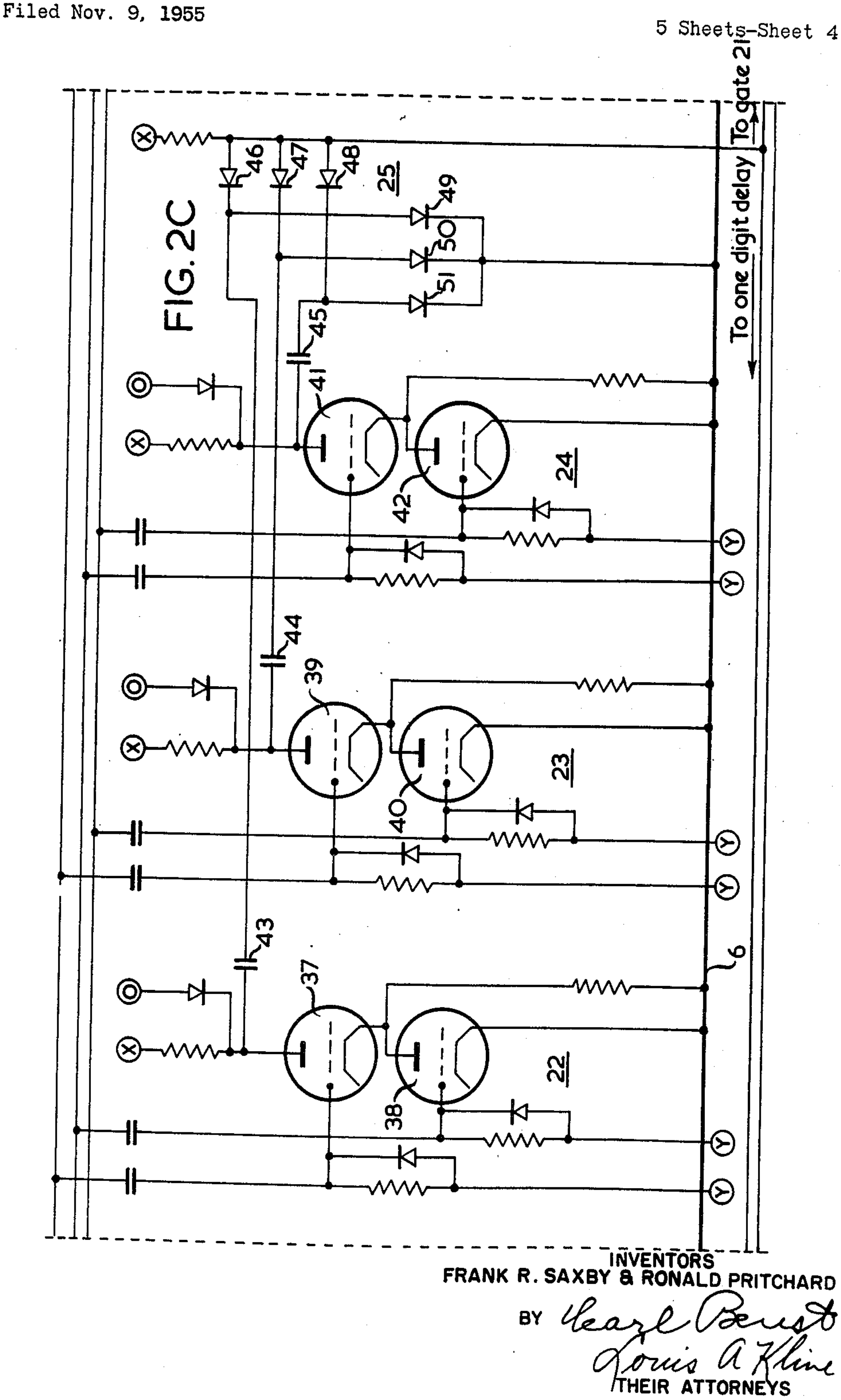

Each two-coincidence gating device 22, 23, and 24, shown in Fig. 2C, is similar in construction and operation to the three-coincidence gating device 17 described above, except that each comprises a pair of triode tubes 37, 38; 39, 40; and 41, 42. Each pair, e.g. 37, 38, are connected in series between the positive potential source X and ground line 6 and are normally biased to the "off" condition by a biasing arrangement similar to that described for the tubes of gating device 17. A negative output pulse is produced in the anode circuit of tube 37, 39, or 41, only when a coincidence of positive pulses A, B; A, C or B, C, respectively, are applied to both grids of a pair of tubes. The negative output pulses are applied via coupling capacitors 43, 44, and 45, to the three input circuits of mixing device 25.

*Three-input mixers*

The three-input mixing circuit 25 shown in Fig. 2C comprises three clamping diodes, preferably crystal diodes 46, 47, and 48, connected between the anode circuits of tubes 37, 39, and 41, respectively, and the source of positive potential X. Three further diodes 49, 50, and 51, are provided in the anode circuits of tubes 37, 39, and 41, respectively, and connected in series with the clamping diodes 46, 47, and 48, respectively, and coupled to the common ground line 6. The diodes receive a small current flow from the potential source X and are connected so as to prevent a negative pulse produced in the anode circuit of one of the tubes 37, 39, or 41, from affecting either of the other two tubes. Any combination of the three pulses A, B, or C, applied to this mixing circuit from any or all of the two-coincidence gating devices 22, 23, or 24, produces a single negative output pulse therefrom, which is applied to the inhibiting input circuit of the inhibitor gating device 21, via coupling capacitor 52 (Fig. 2D), so as to inhibit the passage through the gate 21 of positive pulses from the output circuit of the three-input mixing circuit 20.

Figure 2D:
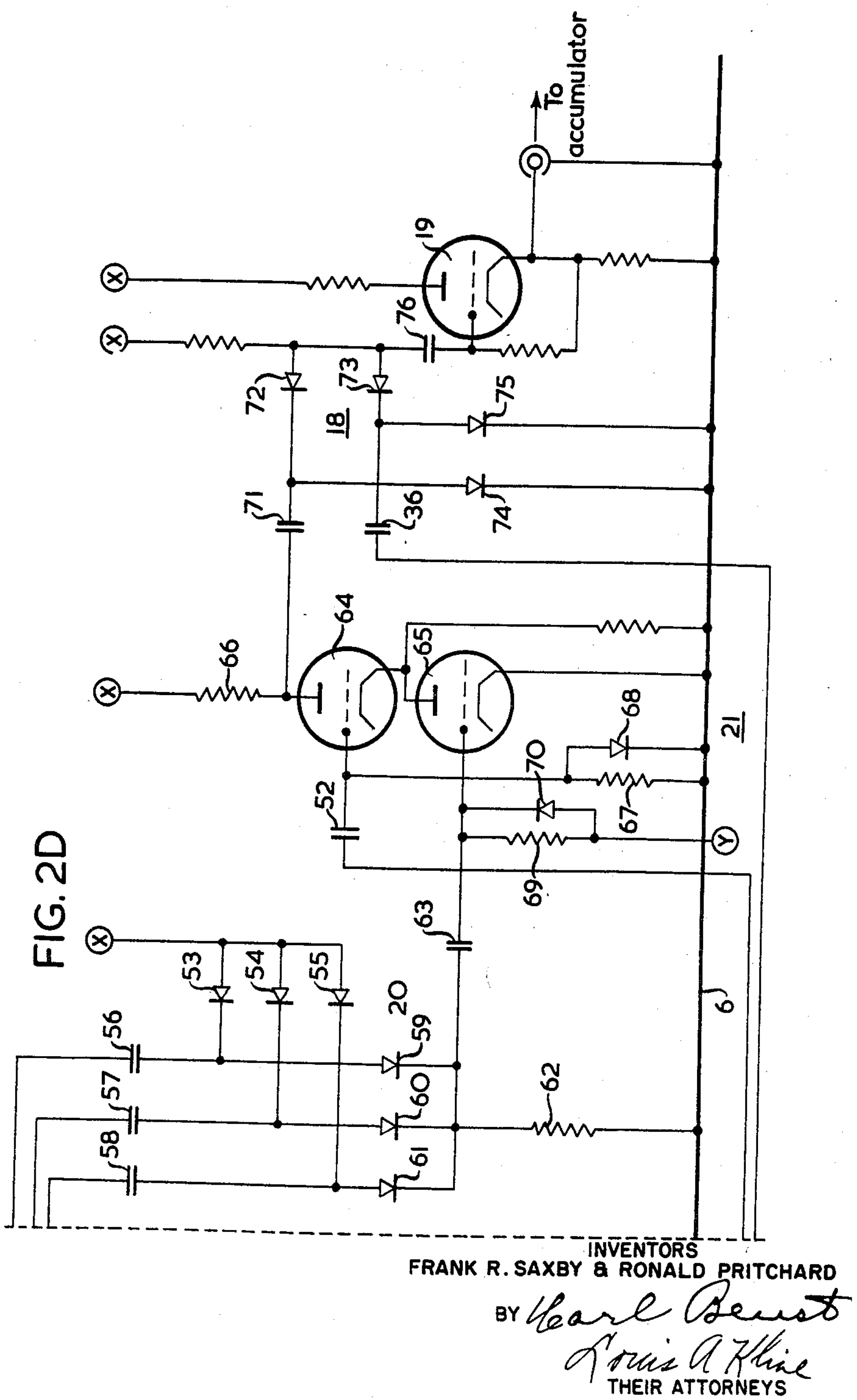

The latter device 20, shown in Fig. 2D, is similar in construction to the mixing circuit 25 described above; three clamping diodes 53, 54, and 55, being connected between positive potential source X and the output circuits of the input means 1, 2, and 15, via coupling capacitors 56, 57, and 58, respectively. Three further diodes 59, 60, and 61, are connected in series with clamping diodes 53, 54, and 55, respectively, and coupled to the common ground line 6 via a common resistor 62. The diodes receive a small current flow from the potential source X and are connected so as to prevent positive pulses received from any one of the output circuits of the input means from affecting either of the other two output circuits. Any combination of the three pulses A, B, or C, applied to this mixing circuit from any or all of the output circuits of the input means produces a single positive pulse therefrom which is applied to the input circuit of the inhibitor gating device 21 via coupling capacitor 63 and passed to the two-input output mixing circuit 18 in the absence of any negative pulse in the inhibiting circuit of the inhibitor gate 21.

*Inhibitor gate*

The inhibitor gating device 21, shown in Fig. 2D, comprises a pair of triode tubes 64 and 65 connected in series; the anode of tube 64 being connected via load resistor 66 to the positive potential source X, and the cathode of tube 65 being connected to the common ground line 6. The grid of tube 64 is coupled, via a parallel arrangement of resistor 67 and rectifier 68, to the common ground line 6 such that the tube 64 is normally biased to a condition such that, upon the application of a positive pulse to the grid of tube 65, both tubes will conduct to produce an output pulse in the anode circuit of tube 64.

The grid of tube 65 is coupled, via a parallel circuit containing resistor 69 and rectifier 70, to the source of negative biasing potential Y such that the tube 65 is normally biased to the "off" condition. A negative inhibiting pulse produced from the three-input mixing circuit 25 and applied to the grid of tube 64 via coupling capacitor 52, will reduce the potential on the grid sufficiently to inhibit conduction in either tube. A positive pulse produced from the three-input mixing circuit 20 and applied to the grid of normally non-conducting tube 65 via coupling capacitor 63 will, in the absence of any negative pulse on the grid of tube 64, cause both tubes to conduct and thus produce a negative pulse in the anode circuit of tube 64. However, if the positive pulse on the grid of tube 65 is applied simultaneously with the negative pulse on the grid of tube 64, no output pulse will be produced from the inhibitor gate since the negative pulse will inhibit conduction in both tubes. It is thus seen that a negative pulse applied to the grid of tube 64 inhibits the passage of a positive pulse applied to tube 65 from the mixing circuit 20. The absence of a negative pulse on the grid of tube 64 will allow a negative pulse to be produced in the output circuit of the inhibiting gating device 21, for application to one of the input circuits of the two-input mixing device 18 via coupling capacitor 71.

*Two-input mixing circuit*

The two-input mixing circuit 18, shown in Fig. 2D, is similar in construction to the three-input mixing circuits 20 and 25 previously described and comprises a pair of crystal clamping diodes 72 and 73; diode 72 being coupled to the anode circuit of inhibitor output tube 64 via coupling capacitor 71 and diode 73 being coupled to the cathode follower tube 35 forming the output circuit of the three-coincidence gating device 17, via coupling capacitor 36. A further pair of diodes 74 and 75 are connected in series with diodes 72 and 73, respectively, and coupled between anode circuit of tube 64 and cathode circuit of tube 35, respectively, and the common ground line 6. The diodes are connected to the positive potential source X so as to provide a small current flow therethrough. A single negative pulse is produced from the mixing circuit when negative pulses are received from the inhibitor gating device 21 and/or the three-coincidence gating device 17. Such a single negative pulse is applied, via coupling capacitor 76, to the grid of cathode follower tube 19, the negative pulse produced in the output circuit thereof being transferred back to the accumulator.

*One-digit delay device*

The device 16 used in the adder to obtain a one digit delay to effect a carry-over operation is shown in Fig. 2A and comprises an electron discharge tube 77, preferably of the cold cathode type, having a trigger electrode connected to the output circuit of the three-input mixing circuit 25 via differentiating capacitor 78. The cathode of the tube 77 is connected to a source of positive shift pulses S similar to those used for shifting the pattern stored in the shifting registers as previously described.

Negative inhibit pulses from the output circuit of mixing circuit 25 are first effectively differentiated by capacitor 78. The negative-going step function of such differentiated pulses are blocked by a rectifier 79 located in the trigger circuit of the tube. The positive-going step function of each of such differentiated pulses, which are applied to the trigger electrode during an inhibit shift pulse period, is stored in a capacitor 80 coupled between the trigger electrode and a source of positive potential Z, of 150 v. As the inhibit shift pulse disappears, capacitor 80 will discharge through the trigger electrode to lower the potential of the priming gap sufficiently to cause the tube 77 to conduct, the polarity of rectifier 79 preventing the discharge of capacitor 80 therethrough.

During the next inhibit shift pulse period, a positive shift pulse applied to the cathode of tube 77 will cause the tube to be extinguished, thereby producing a positive-going pulse in the anode circuit of tube 77 which is applied to the input circuit of the carry-over input means 15 as seen in Fig. 1. It can thus be seen that a one-digit carry-over pulse received from the three-input mixing circuit 25 is stored in the one-digit delay device 16 during one shift pulse period and then applied to input means 15 during the succeeding shift pulse period.

The positive pulses output from the one-digit delay device 16 are passed to the carry-over input means 15, which is similar in construction and operation to the input means 1 and 2, and includes a differentiating circuit 81 (Fig. 2B) to which the positive-going pulses are applied. Due to the action of the diode in differentiating circuit 18, positive-going step functions only are allowed to be passed on to a pair of amplifying tubes 82 and 83 and thence to the grid of a cathode follower tube 84 from the output circuit of which are produced the positive output pulses "C."

*Operation*

The "modus operandi" of the adder of the present invention will now be described with particular reference to the logical circuit diagram of Fig. 1.

During the period of the first shift pulse for shifting the binary representation stored in the shifting registers, assume that a binary "one" is output from the input means 1 in the form of a positive pulse A and that there is no output from input means 2 and no carry-over stored in the one-digit delay device 16. Pulse A will be insufficient to open gating devices 17, 22, 23, or 24, as hereinbefore explained, but will be applied to the input circuit of the inhibitor gating device 21 via the three-input mixing circuit 20. Since the gating devices 17, 22, 23, and 24, are all closed, no negative inhibiting pulse will be applied to the inhibiting input circuit of gating device 21 and thus pulse A will pass through the gate and to the accumulator via output mixing circuit 18.

A similar sequence of operations will occur with no pulse A output from input means 1 or carry-over pulse C output from means 15, but a positive pulse B output from means 2, and similarly with no pulse A or B output from means 1 or 2, respectively, but a carry-over pulse C output from means 15.

During the second shift pulse period assume that pulses A and B are output from input means 1 and 2, respectively. The three-coincidence gating device 17 will remain closed, as will also the two-coincidence gating devices 23 and 24 which are all responsive to a combination of pulses including pulse C. However, gating device 22 will receive the necessary coincidence of pulses A and B required to open this gate and a negative pulse will be produced in the output circuit thereof and passed, via the three-input mixing device 25, to the trigger electrode of tube 77 of the one-digit delay device 16. The positive differentiated portion of this pulse is stored in the capacitor 80 as previously described.

During this second shift pulse period, the negative pulse produced in the output circuit of the three-input mixing circuit 25, due to the mixing of pulses A and B, will also be applied to the inhibiting input circuit of the inhibitor gating device 21 thereby inhibiting the passage of the positive pulse output from the three-input mixing circuit 20 due to the mixing of pulses A and B applied thereto. Thus, the pulse derived from the mixing of pulses A and B will not be passed on to the accumulator via output mixing circuit 18, but will be stored as a carry over in the one-digit device 16.

Assuming, for the sake of illustration, that during the third shift pulse period, positive pulses A and B are again output from the input means 1 and 2, respectively, it will be apparent that all the gating devices 17, 22, 23, and 24, will be opened by the application thereto of the correct combination of pulses A and B and the pulse C which was stored in the one-digit delay device 16 during the second shift pulse period and reproduced during the succeeding pulse period.

Thus, a negative pulse will be produced in the output circuit of the three-coincidence gating device 17 and passed, via the two input output mixer 18, back to the accumulator. Furthermore, output pulses will be produced in each of the output circuits of the two-coincidence devices 22, 23, and 24, producing a single negative pulse in the output circuit of the three-input mixing circuit 25 which, as described for the second shift pulse period, will inhibit the passage through the gating device 21, of a positive pulse derived from a mixing of the pulses A, B, and C, in the three-input mixing circuit 20. The negative pulse produced in the output circuit of the three input mixing circuit 25 will also be applied to the trigger electrode of tube 77 of the one-digit delay device 16 as previously explained, to effect a carry-over stored in the device 16 until the application of the succeeding shift pulse.

It is thus seen that, with an output pulse received from each of the input means 1, 2, and 15, a pulse is passed to the accumulator and a further pulse is stored in the one-digit delay device 16.

What is claimed is:

1. In a digital serial bindary adder, a carry-delay device comprising a gas tube having at least an anode, a cathode, and a firing electrode; an input firing circuit connected to the firing electrode for receiving any carry signal in the form of a negative pulse; an output circuit connected to the anode; means for introducing a series of positive shift pulses to the cathode; and means responsive to the carry pulse for holding the potential level of the firing electrode high until a positive shift pulse decays to fire the tube, thereby producing a delayed carry pulse in said output circuit.

2. The carry-delay device of claim 1 wherein the input firing circuit includes unidirectional means for selecting the positive step function portion of any carry signal pulse; and the means responsive to the carry pulse include a source of positive potential and a capacitor connected thereto for storing the selected positive step function portion of any carry signal pulse.

References Cited in the file of this patent

UNITED STATES PATENTS

| | | |
|---|---|---|
| 2,562,295 | Chance | July 31, 1951 |
| 2,609,143 | Stibitz | Sept. 2, 1952 |
| 2,643,820 | Williams et al. | June 30, 1953 |
| 2,693,907 | Tootill | Nov. 9, 1954 |
| 2,758,787 | Felker | Aug. 14, 1956 |

OTHER REFERENCES

Electronic Anti-Aircraft Fire Control Predictor—R.C.A Research Laboratories publication, April 14, 1942, pages 71 to 74, Fig. 3.21. Listed, Office Publication Board, Commerce Department, OPB 80702, November 7, 1947.

Auerbach et al.: The Binac, Proceedings of the I.R.E., January 1952, pages 19 and 20.